US008000910B2

(12) United States Patent
Bickel

(10) Patent No.: US 8,000,910 B2
(45) Date of Patent: Aug. 16, 2011

(54) AUTOMATED VOLTAGE ANALYSIS IN AN ELECTRICAL SYSTEM USING CONTEXTUAL DATA

(75) Inventor: Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 663 days.

(21) Appl. No.: 12/150,657

(22) Filed: Apr. 30, 2008

(65) Prior Publication Data

US 2009/0276170 A1 Nov. 5, 2009

(51) Int. Cl.
*G06F 17/00* (2006.01)
(52) U.S. Cl. ............... 702/58; 702/57; 702/60; 370/503
(58) Field of Classification Search .............. 702/57–61, 702/164; 370/503
See application file for complete search history.

(56) References Cited

U.S. PATENT DOCUMENTS

| 7,272,518 | B2 | 9/2007 | Bickel et al. |
| 2003/0101008 | A1 | 5/2003 | Hart |
| 2007/0005275 | A1 | 1/2007 | Bickel et al. |
| 2007/0014313 | A1 | 1/2007 | Bickel et al. |

FOREIGN PATENT DOCUMENTS

| WO | WO 00/48284 | 8/2000 |
| WO | WO 2007/032944 | 3/2007 |

OTHER PUBLICATIONS

Written Opinion corresponding to co-pending International Patent Application Serial No. PCT/US2009/042022, European Patent Office, dated Dec. 10, 2009, 5 pages.
International Search Report corresponding to co-pending International Patent Application Serial No. PCT/US2009/042022, European Patent Office, dated Dec. 10, 2009, 4 pages.
Yan Liu et al. "Distribution System Outage and Restoration Analysis Using a Wireless AMR System" Dated 2002; (5 pages).

*Primary Examiner* — Drew A Dunn
*Assistant Examiner* — Hien X Vo

(57) ABSTRACT

A voltage analysis algorithm for automatically determining anomalous voltage conditions in an electrical system monitored by a plurality of intelligent electronic devices (IEDs) and automatically making recommendations for ameliorating or eliminating the anomalous voltage conditions. The electrical system hierarchy is determined automatically or manually, and the algorithm receives voltage data from all capable IEDs. The voltage data is temporally aligned or pseudo-aligned to place the voltage data in both spatial and temporal context. The algorithm determines anomalous voltage conditions systemically by comparing measured voltage values against nominal or expected ones across the system. Based on the spatial and temporal context of the IEDs, the algorithm automatically identifies a source of the voltage deviation in the hierarchy, and recommends a modification associated with the source for mitigating the anomalous voltage condition. The algorithm checks its recommendation to determine any adverse effects on the electrical system and adjusts the recommendation accordingly.

21 Claims, 10 Drawing Sheets

AUTOMATED VOLTAGE ANALYSIS IN AN ELECTRICAL SYSTEM USING CONTEXTUAL DATA

FIELD OF THE INVENTION

Aspects disclosed herein relate generally to utility systems, and, in particular, to a method for automatically analyzing voltage data in a utility system.

BACKGROUND

Facilities that comprise electrical systems may encounter voltage levels on their equipment that deviate from nominal values. For example, for an induction motor rated at 460 volts, an excessive voltage level above 500 volts may be present. End-users may errantly believe that if low voltage levels are unacceptable, then high voltage levels must be acceptable. However, the National Electrical Manufacturers Association (NEMA) Standards Publication No. MG 1 specifically points out that elevated voltage levels are just as damaging to the viability of a motor as low voltage levels (not to mention the adverse impact to the motor's efficiency). Other types of loads besides motors would also experience reduced efficiencies and shortened life due to extensive voltage deviations (e.g., lighting systems would experience shorter bulb life, reduced light efficacy, etc.). Providing each piece of equipment within the electrical system with the appropriate voltage level is important for that equipment's longevity and efficiency.

For example, when the equipment is an induction motor, at full load current, a ±10% voltage deviation can substantially increase the core losses of the motor resulting in overheating and potential damage to the motor's insulation over time. When starting a motor during severe undervoltage conditions, the developed torque may not be sufficient to allow the motor to come up to speed. Because motors are designed to operate most efficiently at their nameplate voltage rating, operating outside of a motor's recommended voltage rating will also decrease the motor's performance due to the introduction of additional losses into the electrical system.

By way of another example, when the equipment comprises fluorescent lamps, deviating outside of the recommended voltage range may have negative consequences including shortened lamp and/or ballast life, reduced efficacy, potential starting issues, and overheating.

Because maintaining the proper voltage levels is important to all aspects of an electrical system's operation and performance, it would be beneficial for end-users to continuously have a thorough awareness of the voltage levels throughout their electrical power system. Empirical data collected from an array of end-users has shown that even customers with extensive power monitoring systems (and data from those monitoring systems) are unaware of potentially damaging voltage levels that exist in their facilities. This "unawareness" is primarily due to the lack of experience and knowledge of their electrical system, their equipment, and of the monitoring system itself. The consequences to a specific end-user include the loss of productivity, revenue, equipment, reputation (due to not meeting deadlines), etc. The aggregate consequences of this problem to global resources and the economy are staggering with potentially billions of dollars unnecessarily wasted in energy and lost productivity costs.

Today, end-users cannot easily determine whether any component in their electrical system is operating at or near its desired nominal voltage rating. Voltage data can be accumulated at various monitoring points throughout the system, but only in an incoherent and disorganized manner that presents a large amount of non-contextualized voltage data to the end-user making it very tedious and time consuming to identify voltage deviations and their potential sources. Without any spatial or temporal context for the voltage data, an end-user may simply choose to ignore, overlook, or fail to realize voltage deviations in the electrical system and how those deviations might be affecting other equipment or overall system performance, an oversight which can disadvantageously result in inefficient operation, overheating, damage, mis-operation, or nuisance tripping.

What is needed, therefore, is an automated method for determining sources of anomalous voltage conditions by analyzing voltage data in spatial and (pseudo-) temporal context and for recommending modifications to the electrical system equipment to ameliorate or eliminate the anomalous voltage conditions.

BRIEF SUMMARY

An algorithm provides a logical and automated evaluation of anomalous voltage conditions (also called voltage deviations or voltage variations) and further provides recommendations from a system perspective for ameliorating or eliminating the anomalous voltage conditions. Once data is put into spatial and a pseudo-temporal context (either manually or automatically), real-time data (voltage, current, power, energy, harmonic distortion, etc.) from intelligent electronic devices (IEDs) can be analyzed to automatically provide recommendations to mitigate or eliminate existing voltage anomalies. These analyses and recommendations are provided from a true system perspective instead of trying to manually determine problems from a myriad of discrete IEDs. A known system hierarchy allows the algorithm to not only pinpoint extreme voltage deviations and their sources (due to hierarchical context), but recommend resolutions. A few of these recommendations may include:

Tap changes for step-down transformers as needed (keeping in mind seasonal fluctuations of the grid voltage).
Redistribution of loads based on a system knowledge.
Evaluation of capacitor bank locations and control types.

Advantages and benefits over existing techniques include continual evaluations, quicker responsiveness, more consistent and thorough feedback, aggregated system assessments, and straightforward conclusions.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 3B-1 and 3B-2 are flow chart diagrams of a data analysis shown in FIG. 3A according to an aspect of the invention;

Figure 1:
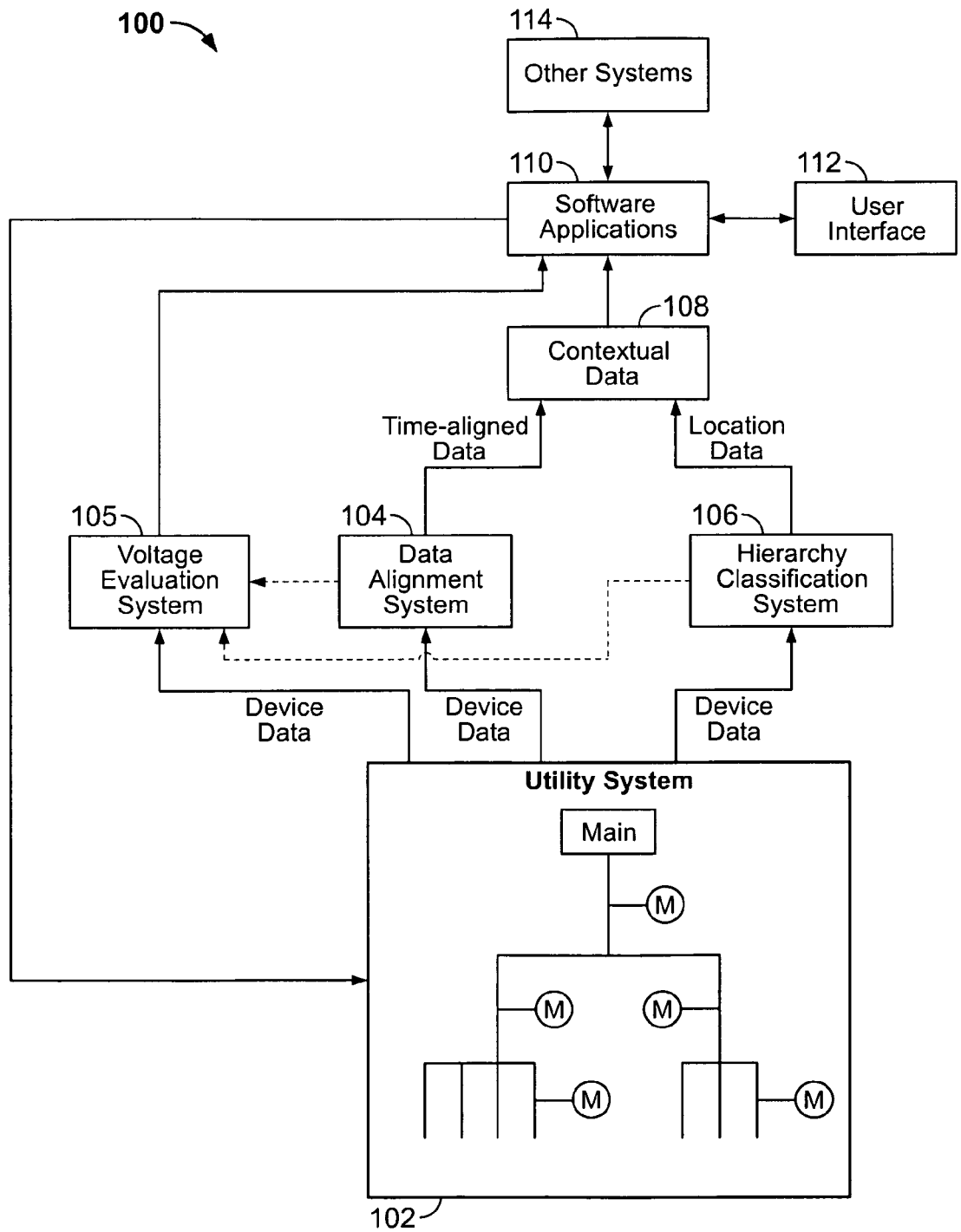
FIG. 1 is functional block diagram of an automated data integration monitoring system that includes a voltage evaluation system in accordance with aspects of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to FIG. 1, an automated data integrated monitoring system 100 is generally shown. An electrical system 102 having multiple intelligent electronic devices (hereafter "IEDs") designated by the letter M provides data from each IED M that is communicated to an automated data alignment system 104 and an automated hierarchy classification system 106. As used herein, an IED refers to any system element or apparatus with the ability to sample, collect, or measure one or more operational characteristics or parameters of an electrical system 102. The data is aligned automatically in temporal or pseudo-temporal context in the automated data alignment system 104 and produces data that is temporally aligned such that it represents the data when it was actually seen simultaneously by the monitoring devices M in the power monitoring system 102. The hierarchy classification system 106 automatically learns the hierarchy of monitoring devices present in the utility system 102 and their positional relationships relative to one another. Examples of the hierarchy classification system 106 and the auto-learned hierarchy algorithms 400, 500, 550 associated therewith are described in commonly assigned U.S. Pat. No. 7,272,518, titled "Automated Hierarchy Classification in Utility Monitoring Systems," issued Sep. 18, 2007, and in commonly assigned PCT Patent Application No. PCT/US2006/034394, titled "Improvements in Hierarchy Determination for Power Monitoring Systems," filed Nov. 5, 2007 [SPL-0099]. A hierarchy as used herein includes a series of ordered groupings of things within a system. These relationships may be physical (based on a power system one-line diagram for example) or functional (based on cost centers or other organizational divisions). In an electrical power system context, a hierarchy describes the organization of the electrical power system (whether utility-side or demand-side of the point-of-common coupling (PCC)). As used herein, an "auto-learned hierarchy algorithm" refers to any of the auto-learned hierarchy algorithms disclosed in U.S. Pat. No. 7,272,518.

The data alignment system 104 aligns data, such as voltage, current, time, events, and the like, from the multiple IEDs in the electrical system 102. When data from all the IEDs is aligned to the same point (or approximately the same point based on pseudo-temporal alignment) in time that the data occurred, the data can be put into a temporal or pseudo-temporal context from which additional decisions regarding hardware and software configuration can be automatically made or recommended. The measured data from various IEDs may be synchronized or approximately synchronized with each other within a temporal or pseudo-temporal context. Temporal alignment is more precise than pseudo-temporal alignment. Pseudo-temporal alignment takes data within an acceptable range based on load changes in the system. Pseudo-temporal alignment systems (which may be also referred herein to as temporally pseudo-aligned systems) typically utilize a global positioning system (GPS) or network time protocol (NTP) for clock synchronization. Automatic temporal alignment implementations are described in commonly assigned U.S. patent application Ser. No. 11/174,099, filed Jul. 1, 2005, entitled "Automated Precision Alignment of Data in a Utility Monitoring System." In an automatic temporal alignment implementation, the data alignment system 104 aligns all IEDs (represented by M) in an electrical system hierarchy to the zero-crossing of all three phase voltages without the use of additional hardware, notwithstanding potential phase shifts between various IEDs, such as for example, those caused by certain transformer configurations. When the data of the monitoring devices is aligned with each other, the system data is essentially aligned with respect to the time it occurred, making more complex data analyses feasible.

Once the data from each IED M is aligned and each IED's position is determined within the hierarchy, the data is said to be in context 108. The contextual data 108 can be used by software applications 110 to provide and diagnose useful information about the electrical system 102 beyond what is generally available if the data is not in context. Each IED measures characteristics of the electrical system 102, and quantifies these characteristics into data that can be analyzed by a computer. For example, the monitoring device may measure power, energy, or other characteristics of electricity. In the electrical context, the IED may be based on a PowerLogic® Series 3000/4000 Circuit Monitor or a PowerLogic® ION7550/7650 Power and Energy Meter available from Schneider Electric or any other suitable IED device such as a microprocessor-based circuit breaker, relay, metering device, or power meter.

A user interacts with the software applications 110 via a conventional user interface 112. The software applications 110 can be linked to other systems 114, such as a billing system, and use the contextual data 108 to communicate messages between the other systems 114 and the user interface 112.

Generally, the hierarchy classification system 106 utilizes an auto-learned hierarchy algorithm in the monitoring system software that is based on rules and statistical methods. Periodically, the monitoring system software polls each monitoring device in the electrical system 102 to determine certain characteristics or parameters of the electrical system 102 at that node (represented by M). Multiple samples of specified parameters are taken from each IED in the system at the same given point in time. Once the parameter data is collected from each node M in the electrical system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the electrical system 102 is correct, the auto-learned hierarchy algorithm ends. The final layout of the electrical system 102 is then presented to the user for concurrence. As each IED's data is evaluated over time (the learning period) with respect to all other IEDs using the auto-learned hierarchy algorithm, a basic layout of the hierarchical structure of the electrical system 102 is determined based on the monitoring points available. In this respect, the auto-learned hierarchy algorithm uses historical trends of the data from each IED, and those trends are compared to determine whether any interrelationship (link) exists between the IEDs. A more detailed hierarchical structure can be determined with more monitoring points available for analysis.

Samples of specific electrical characteristics or parameters (such as power, voltage, current, or the like) are simultaneously taken from each IED in the electrical system 102. This data is stored and analyzed with respect to the time the sample is taken, the associated value of the data point, and the IED providing the data.

Data taken from each IED in the electrical system 102 is compared with each other to determine whether any correlation exists between the IEDs. The data is analyzed for statistical trends and correlations as well as similarities and differences over a predetermined period of time.

Figure 2:
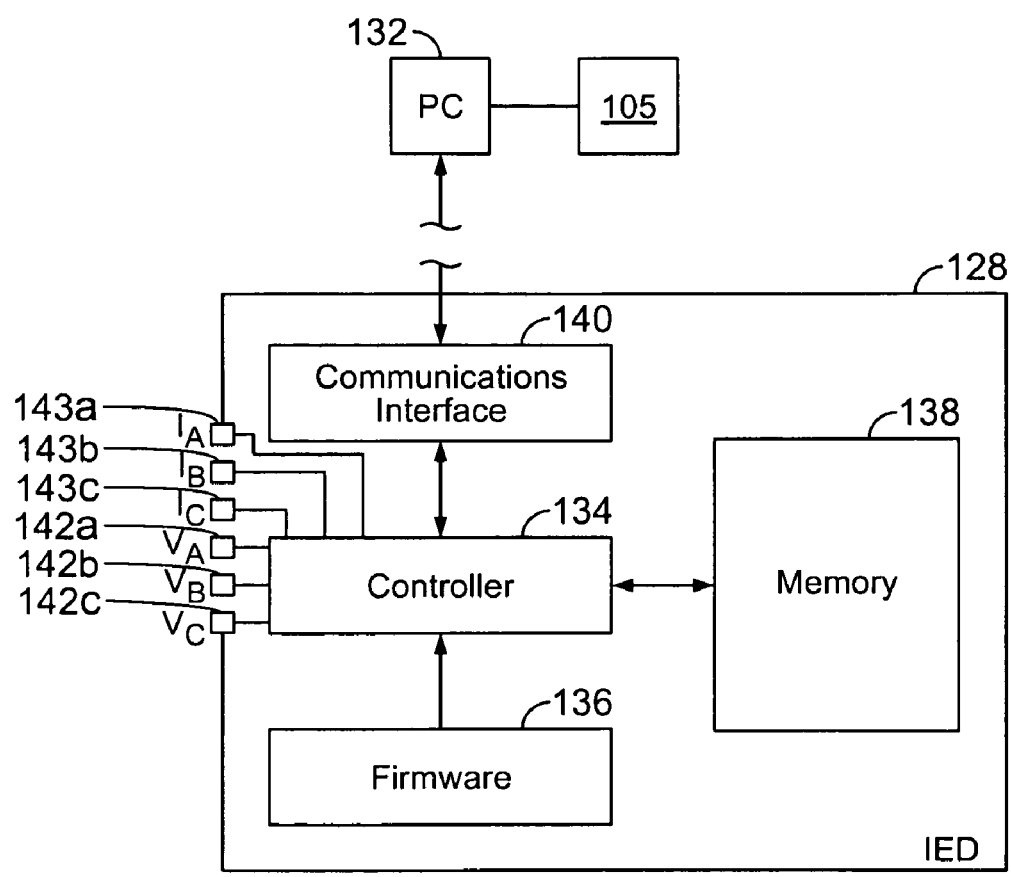
FIG. 2 is a functional block diagram of an exemplary intelligent electronic device.

An exemplary IED 128 is shown as a functional block diagram in FIG. 2. The IED 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the IED 128.

Instructions from a computer 132 are received by the IED 128 via the communications interface 140. Those instructions include, according to an aspect herein, instructions that direct the controller 134 to mark the cycle count, to begin storing electrical parameter data, or to transmit to the computer 132 electrical parameter data stored in the memory 138. The electrical parameter data can include any data acquired by IEDs, including any combination of frequency variations, amplitude variations, and phase variations.

The data integrated monitoring system 100 also includes a voltage evaluation system 105 according to aspects of the present invention, which may receive device data associated with the utility system 102 via manual or automated methods or time-aligned data that has been automatically generated by the automated data alignment system 104. The voltage evaluation system 105 includes the algorithm 300 or the algorithm 1000 as disclosed herein.

Aspects of the implementations disclosed herein automatically provide different evaluations of voltage conditions within an electrical monitoring system (source and load), including:

1. Extent of system voltage deviation issues. In a power monitoring system including multiple IEDs, the voltage evaluation system 105 can determine to what extent voltage deviations affect the electrical system. By quickly locating the affected areas within the electrical system, end-users can ascertain the impact of and respond to voltage deviations related to their operation.

2. Severity of voltage deviation concerns. The voltage evaluation system 105 can assess the severity of voltage deviations across an electrical system with respect to the number of IEDs providing data to a voltage evaluation algorithm. The magnitude of voltage deviations as measured by the IEDs is evaluated against recognized standards (NEMA, IEEE, IEC, etc.), recommendations (ITIC, SEMI, etc.), and user-configured thresholds to rate severity. Duration and periodicity are also considered when rating the severity of voltage deviations.

3. General determination of voltage deviation source. The voltage evaluation system 105 determines whether the source of the voltage deviations is within an end-user's facility or whether the source is on the source-side of the point-of-common coupling (PCC). Guidance to the end-user regarding the potential cause of voltage deviations, to the extent that useful data is available to the voltage evaluation system 105.

4. General recommendations for mitigating voltage deviation problems. The voltage evaluation system 105 provides guidance to the end-user regarding mitigation of voltage deviations within a facility. The recommendations may focus on improvements in voltage regulation, adjustments and/or relocations of loads, and modifications to and/or additions of equipment. Again, these suggestions may concentrate on either or both the end-user or the utility source.

5. General evaluation of a mitigative solution's effectiveness. The voltage evaluation system 105 provides the end-user with an estimation of the effectiveness of any mitigative steps taken to remedy undervoltage and/or overvoltage conditions. Historical data is used to provide this analysis and support any conclusions.

Analysis of Voltage Data

In various aspects, the voltage evaluation system 105 relies on any combination of three factors to perform an analysis of voltage deviations or anomalous voltage conditions: time, location, and other general considerations. While some level of analysis can be performed by any one of these factors, incorporating all three into the evaluations and recommendations will generally provide the most comprehensive results.

The time factor takes into account duration, periodicity, time-series correlations between phases, time-series correlations between multiple parameters, onset characteristics, and so forth. The location factor considers spatial placement of discrete IEDs, spatial placement of equipment (e.g., transformers, etc.), locality of voltage deviations within the hierarchy, source of voltage deviations, proximity of discrete IEDs to equipment, IED groups derived from the same source, generator/UPS locations (if any), and so forth. Other general considerations may include end-user configuration data, phase data from discrete IEDs, additional measured parameters (e.g., current, power, power factor, harmonic components, etc.), equipment characteristics and capabilities, and so forth.

In order to evaluate voltage deviations and make recommendations, relevant data samples 314 are received from each capable IED. One electrical parameter that is collected is voltage. Various characteristics of voltage are measured, compiled and stored from each capable IED including any one or more of phase, magnitude, duration, and time of occurrence information.

Figure 3A:
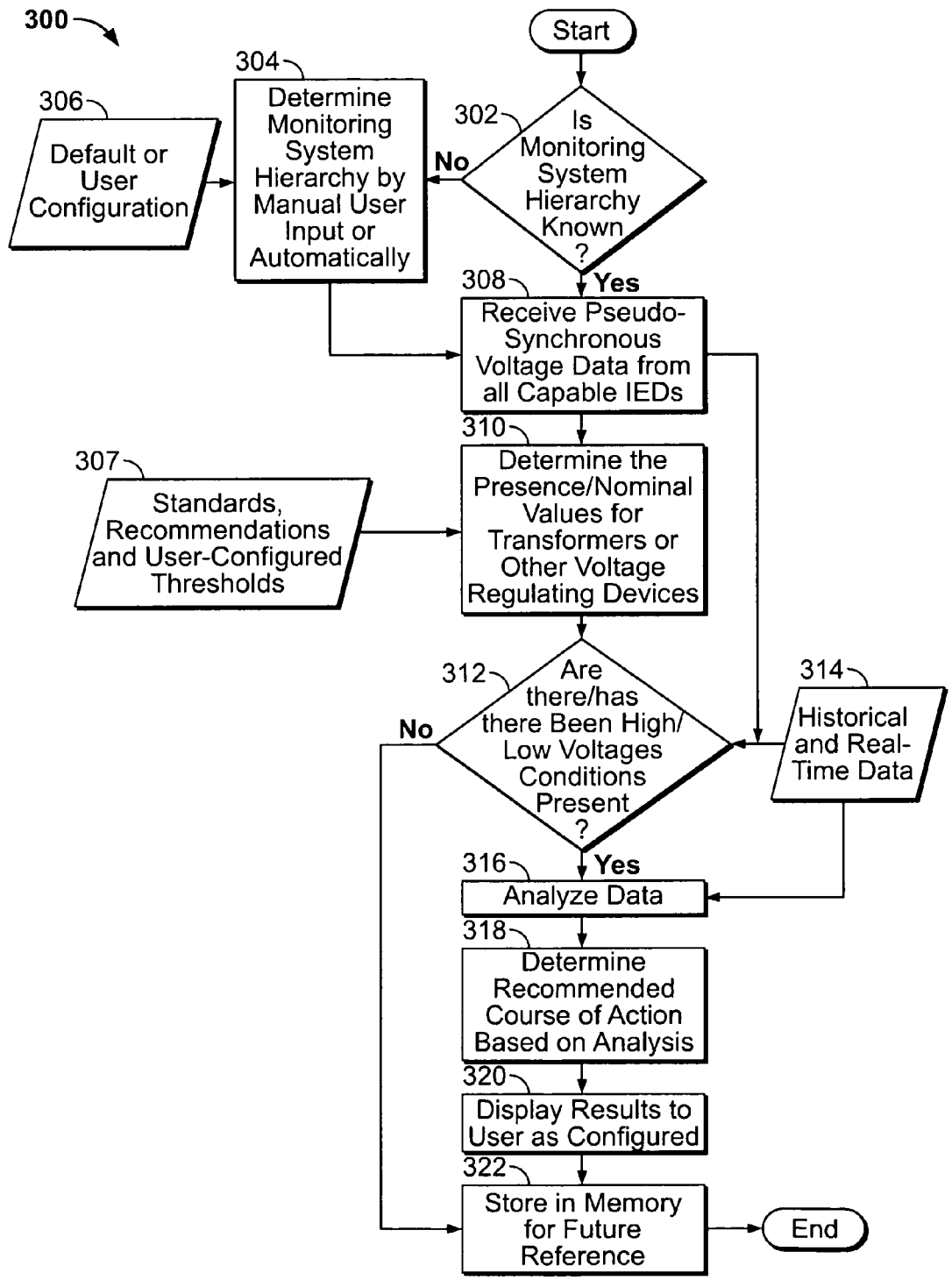
FIG. 3A is a flow chart diagram of an exemplary voltage analysis algorithm according to an aspect of the invention.
Figures 1, 3B:
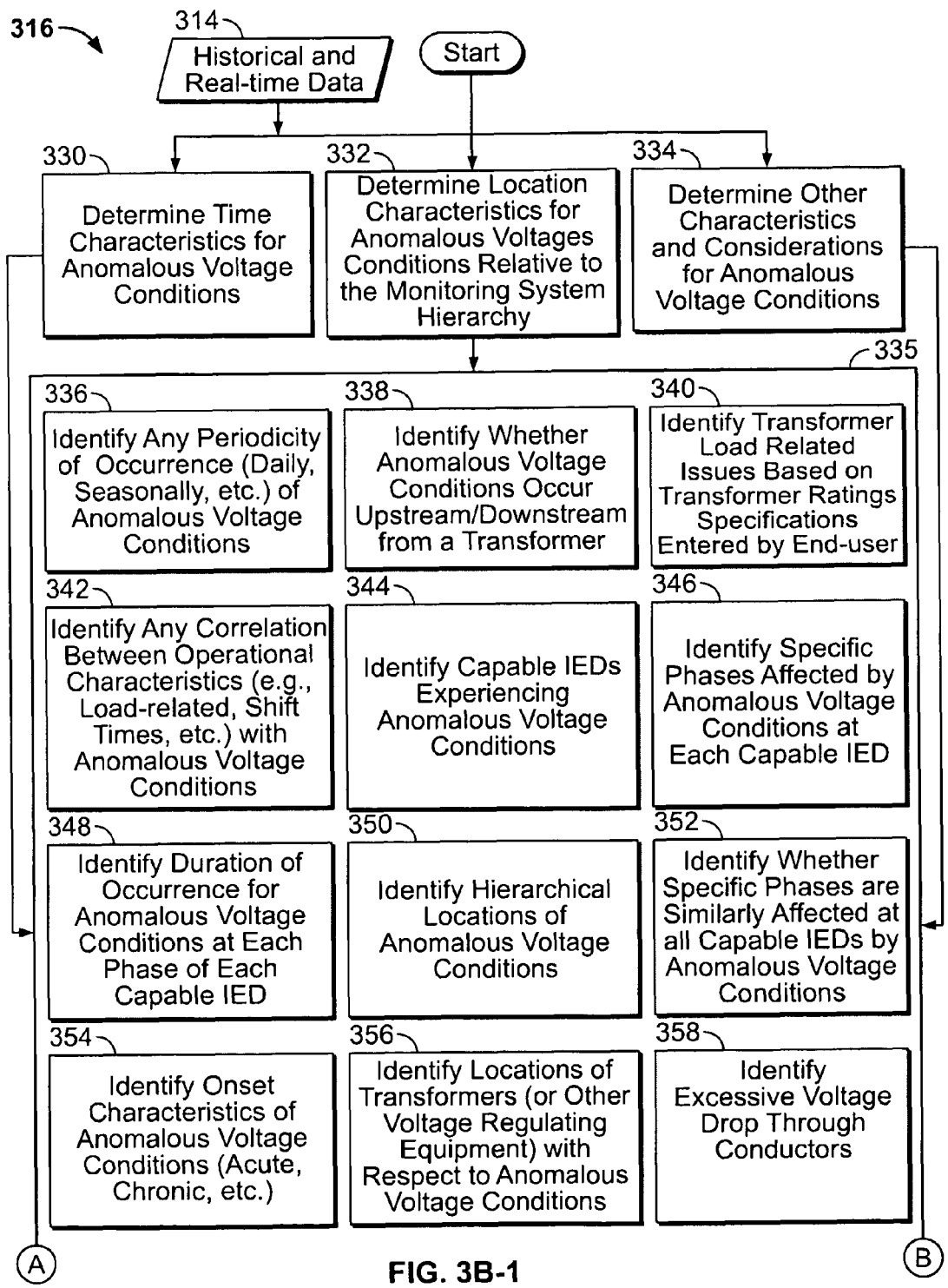
Figures 2, 3B:
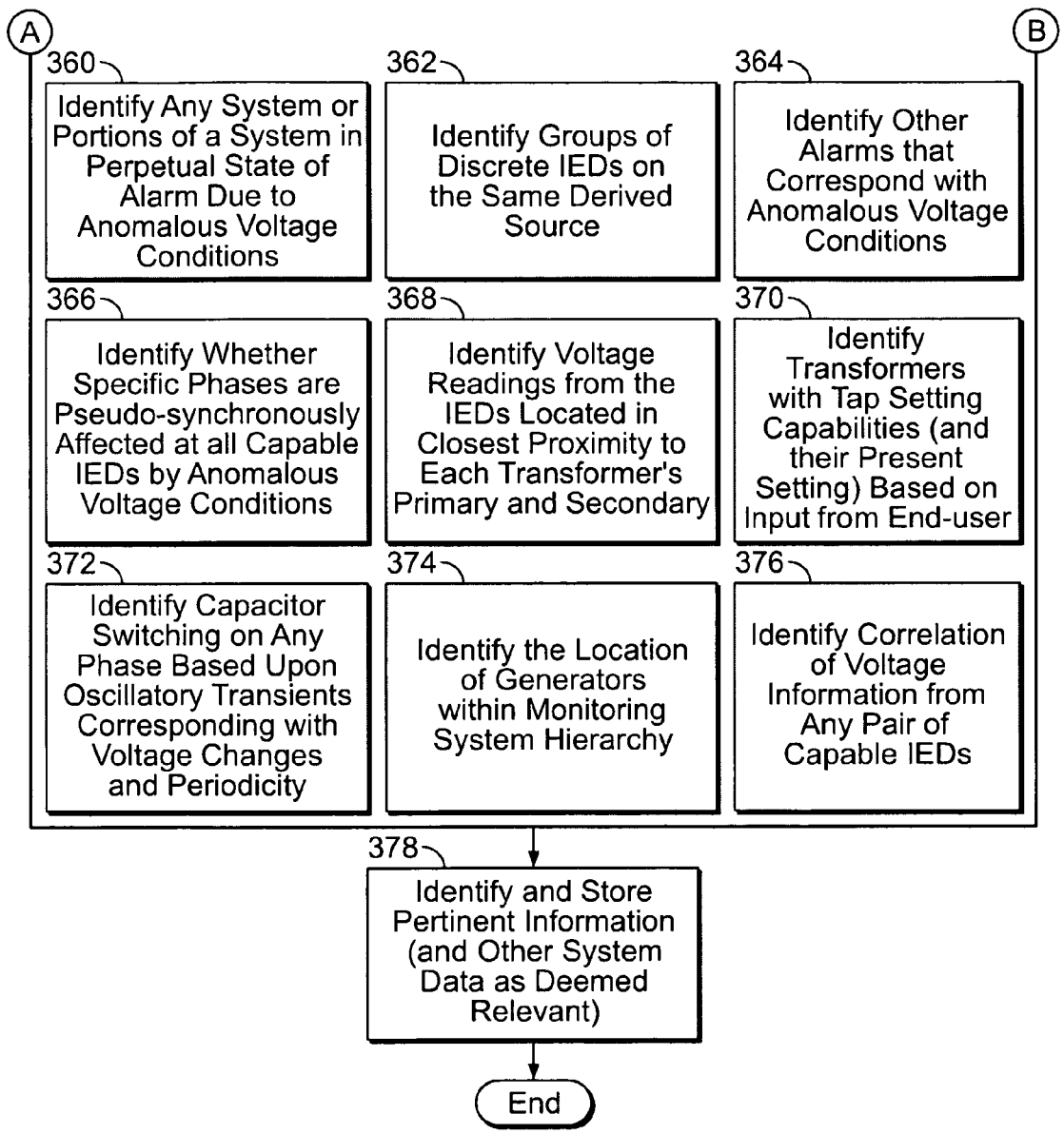
Figure 3C:
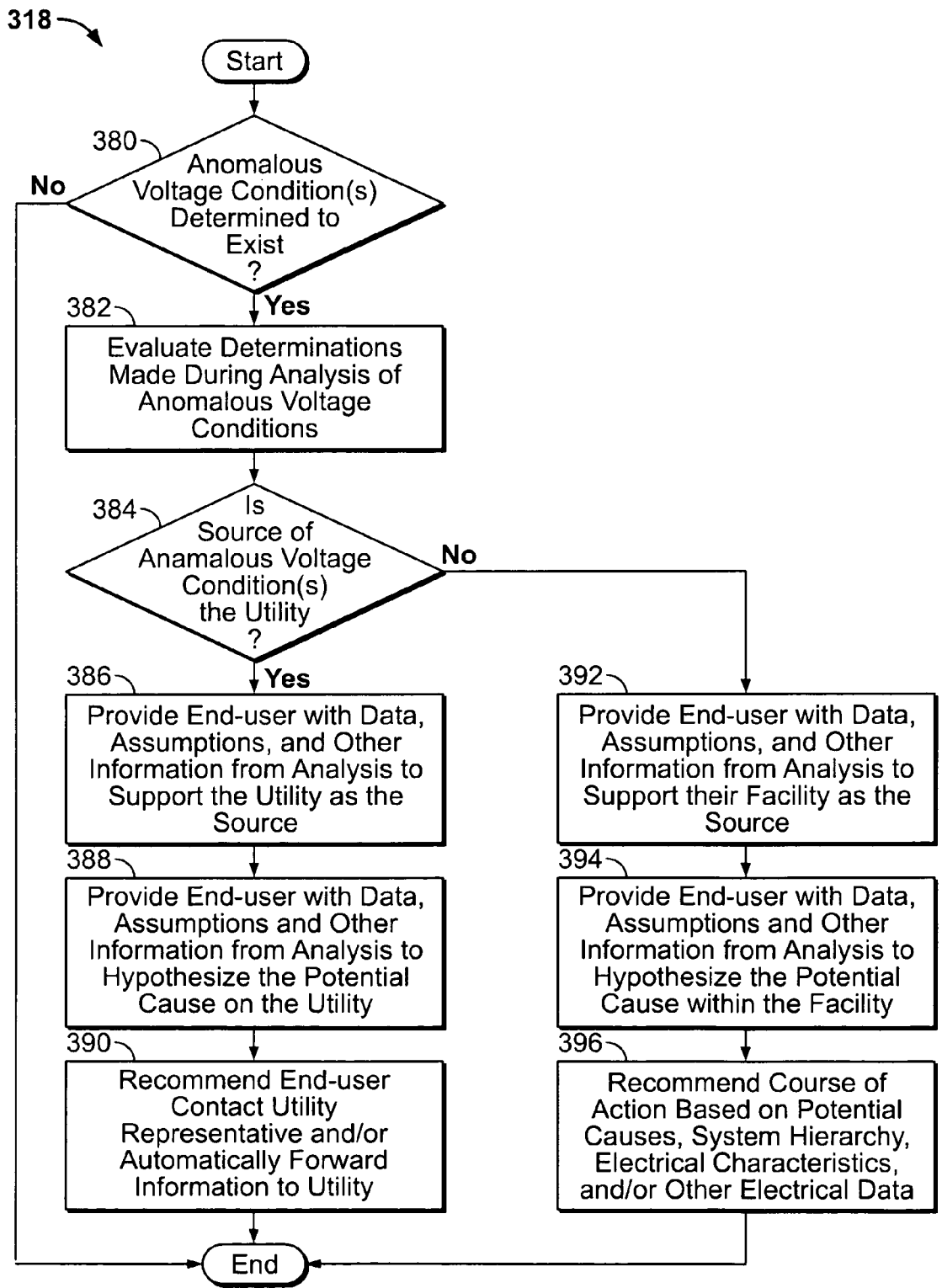
FIG. 3C is a flow chart diagram illustrating a method of determining a recommended course of action based on a voltage analysis according to an aspect of the invention.

FIGS. 3A-3C illustrate an exemplary algorithm for identifying, analyzing and providing the end-user with a recommended course of action. FIG. 3A provides an overview of a voltage analysis algorithm 300 for automatically evaluating anomalous voltage conditions (voltage deviations) present in the electrical system 102. FIGS. 3B-1 and 3B-2 illustrate an exemplary analysis of anomalous voltage conditions on the electrical system 102. FIG. 3C illustrates an exemplary method for recommending a course of action for the end-user. As used herein, an "anomalous voltage condition" includes a short-duration voltage variation and a long-duration voltage variation as those terms are defined in Sections 3.1.72 and 3.1.73 of IEEE 1159-1995.

Determining the extent of voltage deviations within the electrical power system 102 requires hierarchical information about the system 102 (304), multiple data collection points across the system 102, and pseudo-synchronous data alignment from all IEDs used to provide voltage (308) and other data (310).

The algorithm 300 determines whether the monitoring system hierarchy is known (302). Hierarchical information is determined according to one of two methods: manually via manual input by the end-user of the power system's hierarchical information into the system management software 110 via the PC 132, or automatically such as using any of the auto-learned hierarchy algorithms disclosed in commonly assigned U.S. Pat. No. 7,272,518, titled "Automated Hierarchy Classification in Utility Monitoring Systems," issued Sep. 18, 2007 (304). Default or user configuration data 306 may be consulted to assist in building the hierarchy. The configuration data 306 may include any one or more of the following parameters and their potential indications shown in the following table:

| Parameter | Potential Indication |
| --- | --- |
| Active demand synchronization pulse | Device(s) installed at or near main |
| Communication (including IP address, device address, baud rate, parity, bit size, protocol, etc.) | Devices located within the same geographic area due to distance limitations of subnet devices |
| Meter Type | More sophisticated devices located at a higher level in the monitoring system hierarchy |
| System Type | Device(s) installed in near proximity |
| Scaling Factors (including CT/PT ratios, multipliers, auto ranging, etc.) | Device(s) installed in near proximity |
| System Frequency | Devices installed within the same geographic location |

A representation of the hierarchy that is determined automatically or manually is provided by the hierarchy classification system 106 to the voltage evaluation system 105 (306).

It should be observed that hierarchical representations that are automatically determined can be no better than the number of capable IEDs within the system 102 plus a single virtual load on each bus. An exception to this observation exists when the load measured by a discrete IED is either automatically or manually disaggregated.

When voltage deviations exceed some predetermined threshold at any given discrete IED(s), the location(s) of these voltage deviations are noted within the context of the hierarchy. The voltage analysis algorithm 300 receives synchronous or pseudo-synchronous data from all capable IEDs (308) via the data alignment system 104. Having the data temporally aligned provides confidence that the information from each discrete IED corresponds with the information from every other IED. If the data measured by one discrete IED does not correspond temporally or pseudo-temporally with the data measured by another discrete IED, then it is not valid to correlate the two with each other. In short, a temporal correlation strengthens the conclusion that anomalous voltage conditions measured by two discrete IEDs are interrelated.

The algorithm 300 determines the presence of transformers in the electrical system or the nominal values for transformers or other voltage regulating devices in the electrical system (310). These values may be communicated to the voltage evaluation system 105 by the IEDs monitoring the voltage regulating device, automatically determined by the algorithm 300, or they may be entered by the end-user. These nominal values allow the algorithm 300 to determine what the normal voltage or range of voltage should be for that portion or grouping of the hierarchy under consideration. The algorithm 300 determines the presence of transformers in the electrical system based on the measured voltages by the IEDs. The algorithm 300 automatically determines the nominal values of the transformers based on the measured voltages by the IEDs, the nominal frequency, the country location (e.g., a lookup table with nominal transformer voltage values for a given country and measured voltage level), and the standards, recommendations, and end-user configurations 307 available to the algorithm 300.

The algorithm 300 determines whether there has been historically or are presently any high or low voltage conditions (anomalous voltage conditions) present (312) by comparing the voltage measurements reported by the IEDs against the nominal values determined in block (310). When the voltage measurements fall outside of a threshold (set to be a nominal value or a range that includes the nominal value), the algorithm 300 determines that an anomalous voltage condition exists for the IED(s) reporting the anomalous voltage(s).

The algorithm analyzes the historical and real-time data 314 (316), examples of which are illustrated in FIGS. 3B-1 to 3B-2. Based on the data analysis (316), the algorithm 300 determines a recommended course of action (318), and displays its recommendation results to the end-user (320) via the PC 132. The recommendation results and related information are stored in memory (322).

The algorithm 300 analyzes the voltage data and other data received by the IEDs to determine what recommendations can be made to ameliorate or eliminate the anomalous voltage conditions. Turning now to FIGS. 3B-1 and 3B-2, a block diagram of exemplary data analyses (316) that may be carried out by the algorithm 300 is shown in FIG. 3B-1. The historical and real-time data 314 received by the IEDs is accessible by the algorithm 300 during the data analysis. There are three general categories of characteristics (time, location, and others) that can be determined (330, 332, 334) by the algorithm 300.

Within these categories, the algorithm 300 can carry out any one or more of the blocks 336-376 shown in block 335. The algorithm 300 identifies any periodicity of occurrence of an anomalous voltage condition, where the periodicity may be daily, seasonally, and so forth (336). For example, the algorithm 300 looks for patterns when the anomalous voltage condition occurs and correlates the anomalous condition with a time of day or a season and so forth.

The algorithm 300 identifies whether the anomalous voltage condition occurred upstream or downstream from a transformer (338). The end-user may specify which IED(s) are monitoring a transformer or the algorithm 300 may automatically determine which IEDs are monitoring transformers based on the hierarchy and the measured voltage readings from the IEDs, and because the hierarchy of the electrical system is known to the algorithm 300, when a voltage anomaly is determined by the algorithm 300, the algorithm 300 can determine, by virtue of its knowledge of the hierarchical layout of the electrical system, whether the anomaly occurred upstream or downstream of a transformer.

The algorithm 300 identifies transformer load-related issues based on transformer load ratings specification entered by the end-user (340). The end-user enters transformer load ratings specification into the algorithm 300, and the algorithm 300 determines whether there is an issue relating to any loads electrically coupled to that transformer. For example, the algorithm 300 may determine that the transformer load rating is insufficient to support its present load and can make recommendations on bringing the transformer rating into conformance with the load requirements, or the algorithm 300 may recommend reducing the load on the transformer to bring the load within the transformer rating.

The algorithm 300 identifies any correlation between operational characteristics (for example, load-related characteristics, shift times, and the like) with the anomalous voltage condition (342). For example, there may be voltage deviations that occur at specific times of the day, such as when a certain shift begins work. The beginning shift may be operating the electrical system differently than other shifts, resulting in an increased load, and thus, decreased voltage during this initial shift. Another example is that an end-user's electrical system could operate within acceptable voltage range during the day, but at night voltages may increase significantly because there is less load on the electrical system.

The algorithm 300 identifies those capable IEDs that are experiencing anomalous voltage conditions (344). By capable, it is meant that the IED has the capability to measure relevant data and communicate that data to the voltage evaluation system 105, such as the IED 128 shown in FIG. 2. For example, the algorithm 300 compares the voltage being reported by a capable IED against a nominal voltage for the transformer or other voltage regulating device that supplies the voltage monitored by that IED, and when that comparison exceeds a threshold, the algorithm 300 identifies that IED as experiencing an anomalous voltage condition.

The algorithm 300 identifies a phase or phases affected by the anomalous voltage condition at each capable IED (346). In a three-phase system, each phase is relevant to the successful operation of the end-user's electrical system. There may be voltage deviates on one or two phases, but not the remaining phases. The algorithm 300 checks whether all three phases are experiencing voltage deviations. If not, the algorithm 300 determines how the problem phase or phases affected the entire electrical system. If less than three phases are affected, the algorithm 300 determines that either there is a significant single phase load on the electrical system (based on the hierarchical context and load data from each capable IED), or that there is a voltage regulation problem on one or two phases that is not present on the remaining phase(s). In that case, the algorithm 300 checks whether there was a consistent time of day when this problem was occurring. If the source is the utility, the algorithm 300 checks whether the voltage deviation occurred with a capacitor bank switching on. The algorithm 300 concludes that one or two phases of the capacitor bank may be inoperable due to failure of the capacitor or a blown fuse and may recommend that the end-user replace the failed capacitor or blown fuse.

The algorithm 300 identifies the duration of occurrence of the anomalous voltage condition at each phase of each capable IED (348). For example, the algorithm 300 marks the time when an anomalous voltage condition is first determined and then calculates the duration the anomalous voltage condition exists. The duration may (1) correlate with a shift's work hours or (2) it may correlate with the operation of capacitor banks or (3) it may persist continuously. In the first case, the algorithm 300 may recommend that the shift operate differently by shifting tasks to another time of day or another part of the facility that does not have voltage issues. In the second case, the algorithm 300 may recommend that the capacitors' controls be tweaked or changed to allow a more accommodating operation. The algorithm 300 may recommend that the capacitor bank be reduced in size, increased in size or relocated, for example. In the third case, the algorithm 300 may recommend that the transformer size be increased or that a capacitor bank be added to improve voltage regulation.

The algorithm 300 identifies the locations of the anomalous voltage conditions in the hierarchy (350). Because the algorithm 300 knows the hierarchy of the electrical system being monitored by the IEDs, when an anomalous voltage condition is determined based on voltage data received from an IED in the hierarchy, the location of the IED informs the algorithm 300 the location of the anomalous voltage condition within the hierarchy.

The algorithm 300 identifies whether specific phases are similarly affected at all capable IEDs by the anomalous voltage condition (352). For example, the algorithm 300 compares the voltage data for each phase (A, B, C) from all of the capable IEDs in the electrical system, and if a certain phase is or phases are consistently being affected as monitored by all of the IEDs, the algorithm 300 determines that the anomalous voltage condition is affecting one or more phases on a systemic basis. If two phases are moving high and one is not, then something is affecting the regulation of those two phases. This typically means that the controls for the regulating device are going high, while one of the phases is not receiving the control message or is incapable of responding to the control message. In this case, the algorithm 300 recommends that the end-user adjust the controls to maintain a reasonable voltage level and check the third phase to ensure that it is in good order. If one phase is low, then a single-phase load may be constraining the voltage. The algorithm 300 checks whether a voltage constraint exists by determining if there is an increased power demand at the IEDs measuring the low voltage condition for the given phase. It is also possible that a three-phase voltage regulating device is having problems with one of its phases. The algorithm 300 identifies this issue when it finds no correlation with the demand and the voltage issues.

The algorithm 300 identifies onset characteristics (acute, chronic, and the like) of the anomalous voltage condition (354). For example, the algorithm 300 can determine how much a monitored voltage deviates from a nominal voltage, and rates that voltage with increasing severity the higher it deviates from nominal. Determining the onset characteristics aids the algorithm 300 in determining whether logical patterns are emerging in the severity of the anomalous voltage conditions in the electrical system and whether the conditions persist over time. A gradual onset may indicate a normal operation of the load, e.g., as the load increases over the course of a day, the voltage decreases. An acute onset may indicate a capacitor bank turning on, driving the voltage up quickly, and in this case, the algorithm 300 may recommend that the timing of the capacitor bank be retarded. If the algorithm 300 does not detect a capacitor switching event and the source is on the utility side of the PCC, an acute onset could indicate operation of the LTC (load tap changer) in a substation. In this case, the algorithm 300 may recommend that the end-user contact the utility for assistance in resolving the issue.

The algorithm 300 identifies the locations of transformers or other voltage regulating equipment that are associated with IEDs that observe an anomalous voltage condition (356). The algorithm 300 may determine these locations by searching for a string in the identification data that is communicated by the IED monitoring a transformer, or the location of the transformers may be entered by the end-user. Alternatively, the algorithm 300 identifies the locations of transformers or other voltage regulating equipment by determining the hierarchy of the electrical system and analyzing the measured voltage from the IEDs, and, if there is a significant change in the voltages between two directly linked devices, then there is likely a transformer between the two devices. The significance of the locations of the transformers is explained in more detail with respect to FIGS. 4-8.

The algorithm 300 analyzes system current flows and voltage drops throughout the hierarchy to ascertain excessive voltage drops between linked IEDs in the electrical system. As current flows increase through conductors, the voltage drop also increases. These current losses are dissipated in the form of heat, and may constrain the capacity of the end-user's operation. The algorithm 300 measures the current flow and voltage drop between each pair of directly linked IEDs. If the voltage drop is considered to be significant enough to affect the voltage levels, then the algorithm 300 may recommend adding additional conductors to reduce the impedance between the points measured by the IEDs. Reducing the impedance subsequently results in a reduction of the voltage drop as well, thus improving the overall voltage regulation during steady-state and a periodic operating conditions.

The algorithm 300 identifies any portions of the electrical system that are in a perpetual state of alarm due to anomalous voltage conditions (360). This can help the end-user to resolve the alarm, which may have previously not been associated with an under- or over-voltage condition in the electrical system. By eliminating the anomalous voltage condition, the end-user may clear a persistent alarm that the end-user may have simply ignored due to an inability to pinpoint its cause.

The algorithm 300 identifies groups containing discrete IEDs on the same derived source (362). This aspect is described in more detail with reference to FIGS. 7 and 8 below.

The algorithm 300 identifies other alarms that correspond with anomalous voltage conditions (364). For example, the user may have overload alarms, overcurrent alarms, etc. that may indicate voltage problems. Again, overload alarms indicate an overload, and that overload condition could be causing voltage issues in which case the algorithm 300 recommends that the end-user reduce or relocate the load. Similarly, overcurrent alarms may correlate with undervoltage conditions in which case the algorithm 300 recommends that the end-user reduce or relocate the load.

The algorithm 300 identifies whether specific phases are pseudo-synchronously affected by an anomalous voltage condition at all capable IEDs (366). The algorithm 300 takes into account the considerations identified in blocks (346) and (352) and makes similar recommendations accordingly.

The algorithm 300 identifies voltage readings from the IEDs located in closest proximity to each transformer's primary and secondary windings (368). As mentioned above, two adjacent IEDs with significantly different voltage values are assumed to be on opposite sides of a transformer. If an IED is on the secondary side of a transformer, then the algorithm 300 recommends an adjustment to that transformer's taps to improve the voltage regulation. If an IED is on the primary side of transformer, the algorithm 300 informs the end-user that the solution must come from upstream of the transformer. For example, if the IED is monitoring the primary winding of the service transformer, and the algorithm 300 determines an anomalous voltage condition from the voltage data reported by that IED, then the algorithm 300 can recommend that the end-user contact the utility as the utility is the source of the anomalous voltage condition.

The algorithm 300 identifies transformers with tap adjustment capabilities as well as the present settings of the transformers based on input from the end-user (370). When the algorithm 300 is informed that a transformer has tap adjustment capabilities and what the present settings are, the algorithm 300 can recommend that the end-user change a tap setting on the transformer when an anomalous voltage condition is determined for the IEDs monitoring that transformer.

The algorithm 300 identifies capacitor switching on any phase of an electrical system based upon oscillatory transients corresponding with voltage changes and periodicity (372). Oscillatory transients are determined by the algorithm 300 from the voltage data reported by an IEDs monitoring a capacitor bank. Because the algorithm 300 can determine whether a capacitor bank is present in an electrical system, it can make recommendations on adjusting the capacitor bank to ameliorate or eliminate anomalous voltage conditions caused by the capacitor bank.

The algorithm 300 identifies the location of generators within the monitoring system hierarchy. The knowledge of a separate source within the customer's system implies that there is another point at which the voltage regulation can be improved. For example, the knowledge of a generator in the electrical system hierarchy provides the algorithm 300 with an opportunity to recommend an increase the voltage at the output of the generator.

The algorithm 300 identifies a correlation of voltage information from any pair of capable IEDs (376). This correlation provides redundancy to the decisions made by the algorithm 300.

FIG. 3C illustrates a block diagram of an exemplary course of action (318) that may be recommended by the algorithm 300. Specific examples of recommended courses of actions were detailed above. In general, the algorithm 300 checks whether any anomalous voltage conditions were determined to exist (380), and if so, evaluates the determinations made during the data analysis (316) of the anomalous voltage conditions (382). The algorithm 300 checks whether the source of the anomalous voltage conditions originate from the utility (384). If so, the algorithm 300 provides the end-user with data, assumptions, and other information from the analysis (316) to support its conclusion that the utility is the source of the problem (386). The algorithm 300 provides the end-user with data, assumptions, and other information from the analysis (316) to hypothesize about the potential cause in the utility as to the source of the problem (388). The algorithm 300 recommends that the end-user contact the utility representative and/or automatically forwards the data, assumptions, and other information to the utility (390).

If the algorithm 300 determines that the source of the anomalous voltage condition(s) is not originated in the utility (e.g., it is present in the end-user's facility) (384), the algorithm provides the end-user with data, assumptions, and other information from the analysis (316) to support the facility as the source of the problem (392). The algorithm 300 provides the end-user with data, assumptions, and other information from the analysis (316) to hypothesize about the potential cause in the facility as to the source of the problem (394). The algorithm 300 recommends a course of action based on potential causes, system hierarchy, utility (e.g., electrical) characteristics, and/or other utility (e.g., electrical) data (396).

Figure 4:
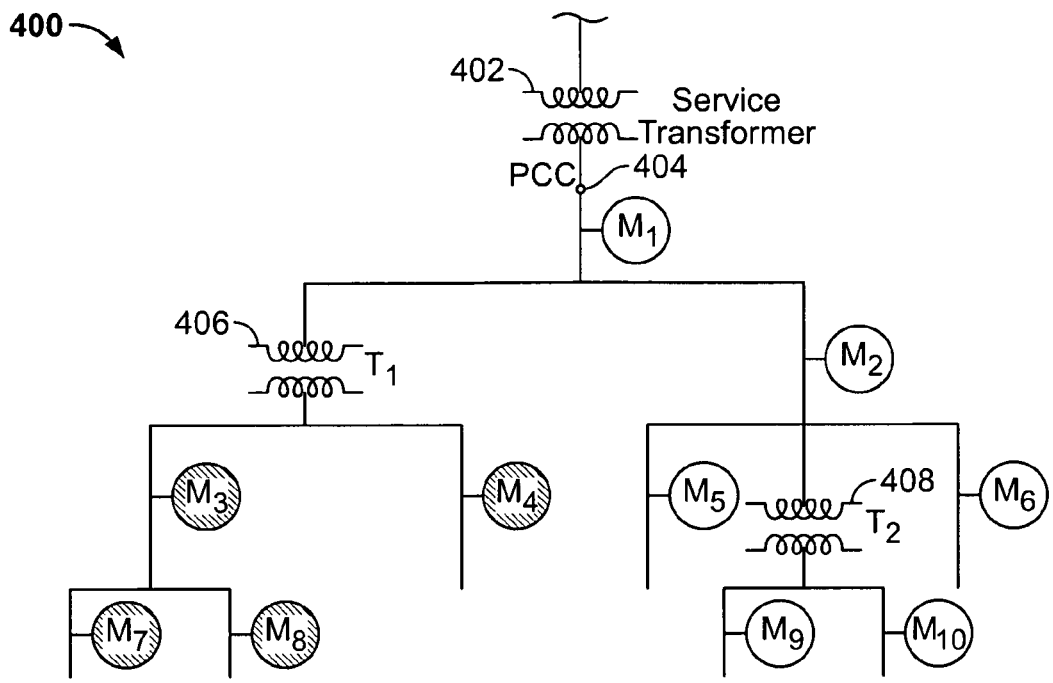
FIG. 4 is a functional block diagram of an exemplary hierarchy showing IEDs reporting anomalous voltage conditions of the same level of severity.

Voltage deviations that are (pseudo-)synchronously determined at multiple IEDs are highlighted within the hierarchical context. FIG. 4 illustrates multiple voltage deviations having a common severity level as measured by multiple IEDs within a hierarchical context, namely IEDs $M_3$, $M_4$, $M_7$, and $M_8$, which are part of an electrical system 400. This hierarchical context provides the end-user with a spatial context of the extent to which the electrical system 400 is affected by voltage deviations. The end-user may then determine the level of severity these voltage deviations pose to the operation of their electrical system/facility. In the illustrated example, IEDs $M_3$, $M_4$, $M_7$, and $M_8$ are reporting voltage deviations having a high severity level. There may be any number of severity levels, such as low or high (red, yellow, or green, etc.) or anything in between.

The extent of voltage deviations within an electrical system is a concern distinct from the severity of voltage deviations within an electrical system. The end-user can specify one or more level(s) of severity at each discrete IED within the electrical system or select one or more levels of severity specified by industry standards and/or industry recommendations. Because industry guidelines may be general or specific to a type of equipment, the voltage analysis algorithm 300 freely allows the end-user to employ different industry standards/recommendations at each discrete IED. Furthermore, the voltage analysis algorithm 300 allows the end-user to employ custom voltage deviation settings at any discrete IED while employing industry standard/recommendations at other discrete IEDs.

Figure 5:
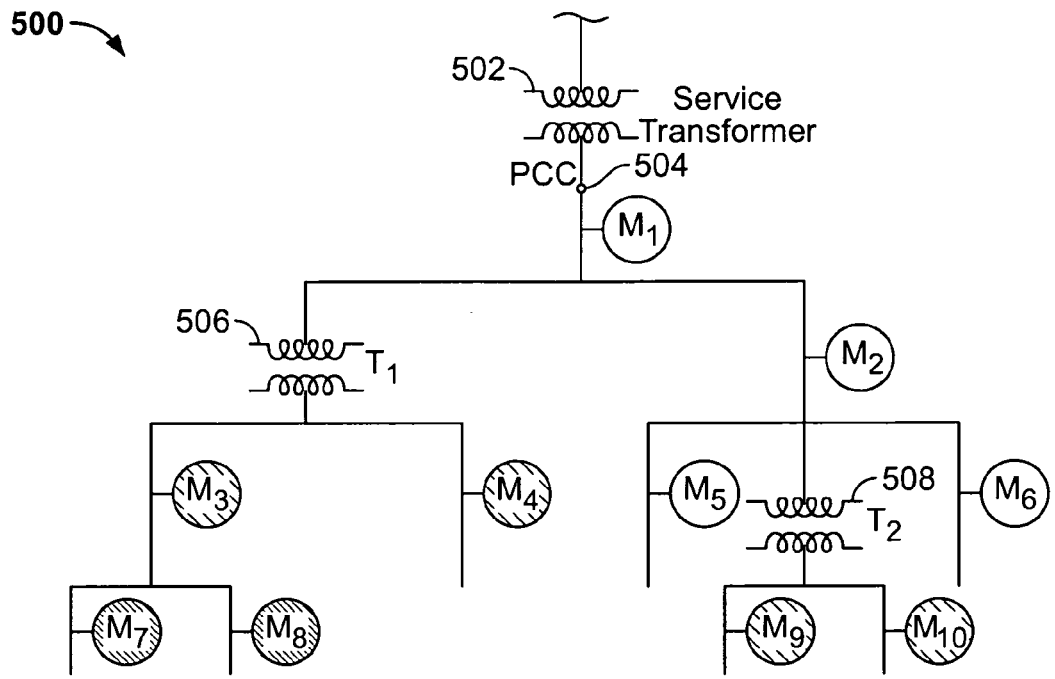
FIG. 5 is a functional block diagram of an exemplary hierarchy showing two IEDs reporting a severe level of severity of an anomalous voltage condition and four IEDs reporting a moderate level of severity of an anomalous voltage condition.

FIG. 5 illustrates two different thresholds of severity within an electrical monitoring system 500. In this example, a IEDs $M_3$, $M_4$, $M_9$, and $M_{10}$ represent a moderate level of severity based on the magnitude of the voltage excursion from the expected voltage value (again, using industry standards/recommendations and customer configured thresholds). IEDs $M_7$ and $M_8$ represent a higher level of severity based on the magnitude of the voltage excursion from the expected voltage value. Severity levels may also be determined based on which specific IED has exceeded a threshold of magnitude, duration, or periodicity.

General Determination of Voltage Deviation Source

Figure 6:
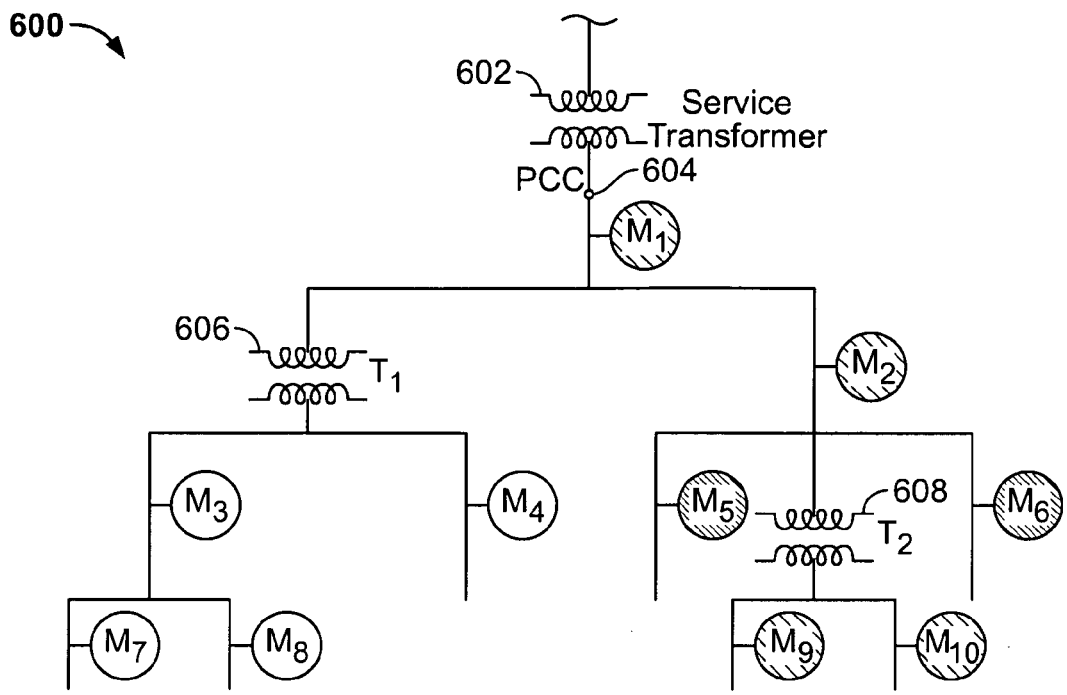
FIG. 6 is a functional block diagram of an exemplary hierarchy showing IEDs downstream of the service transformer reporting different levels of severity of anomalous voltage conditions.

The voltage analysis algorithm 300 can determine the general source of a voltage deviation and this aspect will be discussed in conjunction with the examples shown in FIGS. 6 and 7. Using spatial and (pseudo-)temporal context for the data accumulated from the IEDs, the voltage analysis algorithm 300 provides the end-user with an indication as to whether the source of a voltage deviation is within the end-user's facility or at the utility (e.g., upstream of the service transformer 602). This determination is performed by evaluating voltage data accumulated from each discrete IED based upon an aggregated (system) perspective (spatial and temporal context). The voltage analysis algorithm 300 groups IEDs located between transformers and evaluates voltage data from each respective group of IEDs. In other words, a group of IEDs does not have any intervening transformers in its group. Therefore, a first group includes IEDs $M_1$, $M_2$, $M_5$, and $M_6$ (FIG. 6). A second group includes IEDs $M_3$, $M_4$, $M_7$, and $M_8$. A third group includes IEDs $M_9$ and $M_{10}$. Because the voltage for each distinct group of IEDs is derived from the same source, the IEDs within a distinct group will exhibit similar voltage characteristics providing important clues to the source of the voltage deviations. None of these groups includes any intervening transformers.

As shown in FIG. 6, all IEDs downstream from the service transformer 602 without intervening transformers are indicating at least a moderate severity (e.g., yellow) of voltage deviations (i.e., either overvoltage or undervoltage). The level of voltage deviation experienced downstream from the service transformer increases as the distance from the service transformer 602 increases. Hence, IEDs $M_5$ and $M_6$ are indicating a higher severity (e.g., red) of voltage deviation. This is expected due to the increased voltage drop along the conductors with respect to the increased distance from the service transformer 602. The IEDs downstream from transformer $T_1$ 606 are not indicating any voltage deviations, suggesting that $T_1$ has been tapped to raise the voltage on its secondary terminals. The IEDs downstream from transformer $T_2$ are indicating a moderate severity (e.g., yellow) of voltage deviations. Because the IED in closest proximity and downstream from the service transformer 602 ($M_1$) is experiencing voltage deviations, the service transformer's secondary voltage is outside of its expected range. It can be assumed, therefore, that the source of the voltage deviations is upstream of the PCC 604, and thus, is originating from the utility system and not in the end-user's facility. This conclusion is further validated by the indicated voltage deviations at IEDs $M_2$, $M_5$, and $M_6$, where the latter two IEDs are reporting a higher severity as expected.

It should be noted that voltage deviation indications at IEDs downstream from an end-user's transformers (e.g., T1 and T2 in the FIG. 6 example) provide no direct significance on the utility system as to the source of voltage deviations. That is because transformers are separately derived sources, and as such may have the capability of adjusting the voltage up or down either manually or automatically. This capability means that the data accumulated by a discrete IED must be viewed in the context of where that discrete IED is located with respect to the transformers. Thus, in some aspects, it is important to know where the transformers are located within the utility system 600.

Figure 7:
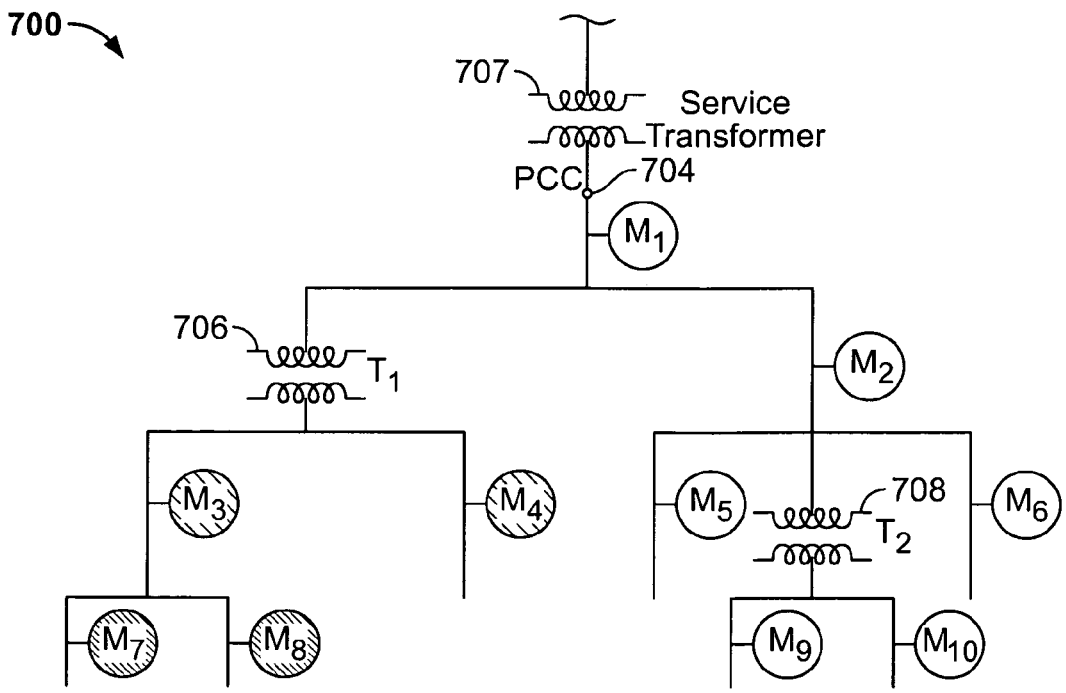
FIG. 7 is a functional block diagram of an exemplary hierarchy showing different IEDs in the same group reporting different levels of severity of an anomalous voltage condition.

By way of another example, FIG. 7 illustrates a hierarchy based on the same monitoring system shown in FIG. 6; however, the IEDs in FIG. 7 are indicating voltage deviations at different IEDs than those shown in FIG. 6. In the FIG. 7 example, the utility is not the source of the voltage deviations because IEDs $M_1$, $M_2$, $M_5$ and $M_6$ (those IEDs just downstream from the service transformer 702 and PCC 704) are not experiencing voltage deviations. All voltage deviations are located downstream from transformer T1 in FIG. 7. The source of the voltage deviations must therefore be internal to the end-user's facility; specifically the transformer 706. Note that the IEDs downstream and upstream of the transformer 708 ($M_1$, $M_2$, $M_5$, $M_6$, $M_9$, and $M_{10}$) are not reporting any anomalous voltage conditions.

While the voltage analysis algorithm 300 can locate the general source of voltage deviations, identifying the source of voltage deviations with greater accuracy can require some initial input from the end-user. For example, knowledge by the algorithm 300 of a transformer's load rating allows the algorithm 300 to determine whether the source of an undervoltage is an overloaded transformer. Because this information cannot be obtained automatically from a conventional transformer, end-user input of the transformer's load rating is required. In some aspects, the end-user inputs each transformer's load rating, voltage rating, impedance, tap changing capabilities, and other transformer characteristics or ratings. Although all of these transformer characteristics data are not required, it does increase the ability of the algorithm 300 to provide a more thorough analysis and more accurate conclusions for the end-user.

Once the location of the source is identified, the voltage analysis algorithm 300 evaluates additional data to ascertain a specific source. If the source is determined by the algorithm 300 to be upstream from the PCC, there are more unknowns to the algorithm 300 because the hierarchy of the utility and its equipment may not be known to the algorithm 300. However, if the end-user has provided the voltage analysis algorithm 300 with certain service transformer ratings (e.g., load, voltage, impedance, tap changing capabilities, etc.), the algorithm 300 can make some recommendations when the source of an anomalous voltage condition is upstream from a PCC, such as the PCC 602 in FIG. 6.

If the source of the anomalous voltage condition is the utility (e.g., upstream from the PCC 602), there are many potential causes for the voltage anomaly:

The service transformer may be inadequately sized.
The input voltage to the service transformer may be low or high.
Distribution/substation capacitor banks may not be operating properly.
Substation load tap changers (LTCs) may not be operating properly.
Distribution voltage regulators may not be operating properly.
Transformer tap settings may not be correct.

Fortunately, each of these exemplary causes has unique symptoms, which if diagnosed properly by the algorithm 300, a specific recommendation can be suggested by the algorithm. For example, the service transformer 602 may not be adequately sized for a given load. A simple comparison of the load rating of the service transformer 602 with its existing load (from the closest downstream IED, e.g., $M_1$ in FIG. 6) can expose this cause to the algorithm 300. If the voltage deviations only occur during certain times of the day, the algorithm 300 can correlate the load of the service transformer 602 with the voltage deviations during these times to determine whether the voltage deviations are load-related. If so, the algorithm 300 can recommend a modification to the load or to the sizing of the service transformer 602.

If the actual load on a transformer appears to be within the recommended range, the algorithm 300 checks the transformer's rated voltage versus its output voltage (from the closest downstream IED). By doing this check, the algorithm 300 can ascertain if the input voltage to the transformer is within an acceptable range. Although the rated impedance of the transformer is useful to calculate the expected voltage drop through the transformer, an estimate of the transformer's impedance can be made by the algorithm 300 based on the transformer's size. If the transformer is not overloaded and the voltage is not within an acceptable range, then it is likely that the utility's distribution voltage is not operating at an acceptable level. Another possibility is that the service transformer's tap settings may not be correct for the end user's facility's requirements. Again, entering this information (if known) into the algorithm 300 would be useful to successfully resolve the voltage issue.

If there are certain times of the day (or even seasonally) when the voltage unexpectedly increases or decreases at the service transformer, the cause may be utility voltage regulating devices such as voltage regulators, LTCs, etc. Some utilities use capacitor banks for voltage regulation as well (typically on rural distribution feeders). Using capacitor banks for voltage regulation can result in extreme voltage swings, especially on the end of a long distribution feeder. This problem is further exacerbated when one or two capacitor bank fuses fail (blow) resulting in extreme voltage unbalance.

If the problem is determined to be within the end-user's facility, such as shown in FIG. 7, the likely cause is either an overloaded feeder/component or inappropriate tap settings for a transformer. In the example shown in FIG. 7, there are moderate and high levels of voltage deviations downstream from transformer 706. If the load rating of the transformer 706 and its voltage ratings are known to the algorithm 300, the algorithm 300 can identify the specific cause for the voltage deviation. The algorithm compares the aggregate loads measured by IEDs $M_3$ and $M_4$ and checks whether they are below T1's load rating. If so, the algorithm 300 compares the voltage ratings of the transformer 706 with the measured voltages at IEDs $M_1$, $M_3$, and $M_4$ to ascertain whether the input/output voltages are within the expected range. As stated above, the impedance of the transformer 706 can be approximated based on the size of the transformer 706 and the voltage and current levels at the primary and secondary of the transformer 706. Additional information provided by the end-user regarding tap settings (if the transformer 706 has taps that can be set) can also be used by the algorithm 300.

The identification and evaluation of data as shown in FIGS. 3B-1 and 3B-2 is important to locate and identify the source of voltage deviations. Time, location and other general considerations related to experiencing voltage deviations are important clues to identifying and mitigating these voltage problems. It should be noted that a graphical representation similar to the any of those shown in FIGS. 4-9 may be displayed to the end-user via the PC 132 with different colors (or numbers, etc.) to represent different levels of severity (e.g., yellow, orange, red).

General Recommendations for Mitigating Voltage Deviation Problems

As discussed above, equipment operates more efficiently and has more longevity when operating at its nominal voltage rating. Keeping voltage levels within acceptable ranges for potentially myriads of equipment in a facility is difficult and challenging. The algorithm 300 provides the end-user with the capability to address voltage deviations from a system perspective by providing guidance to resolve voltage deviations within their facility. The recommendations by the algorithm 300 may be directed to additions (equipment, infrastructure, etc.), modifications (loads, capacitor bank control schemes, transformers, etc.), relocations (loads, capacitor banks, etc.), and other improvements or modifications within a facility's electrical system and/or at the utility source. The hierarchical context of the IEDs and the transformers is important in providing these recommendations.

Figure 8:
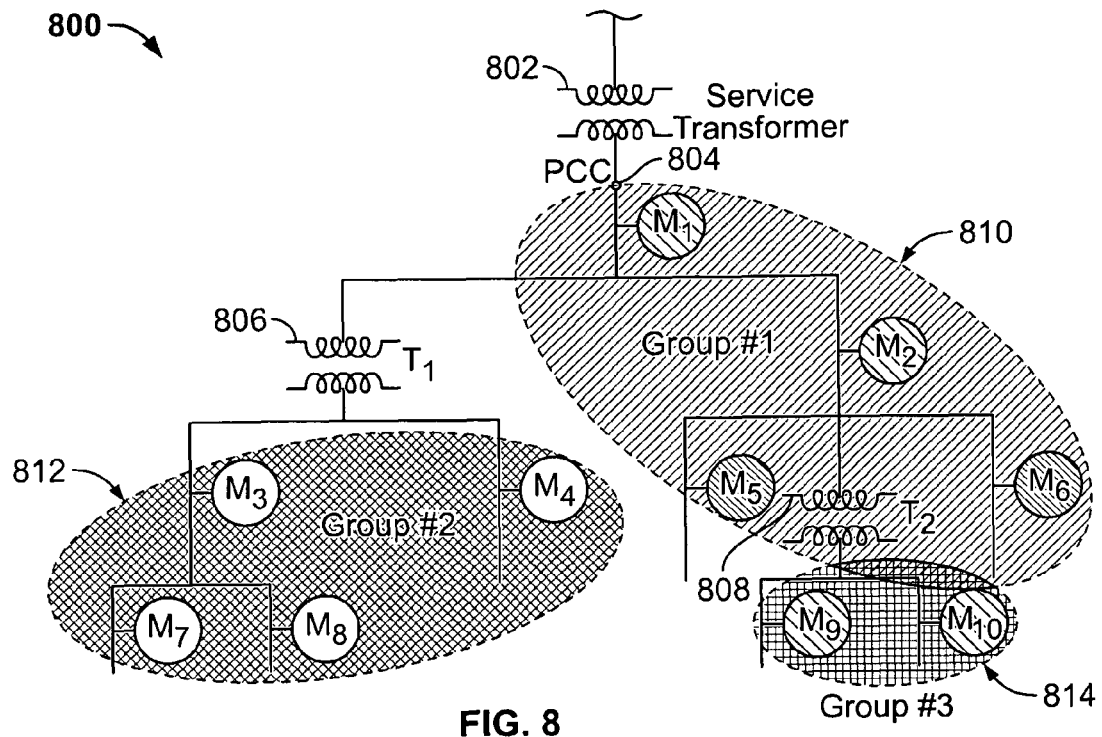
FIG. 8 is a functional block diagram of three groups of IEDs, some of which experience anomalous voltage conditions, in an exemplary electrical system hierarchy.
Figure 9:
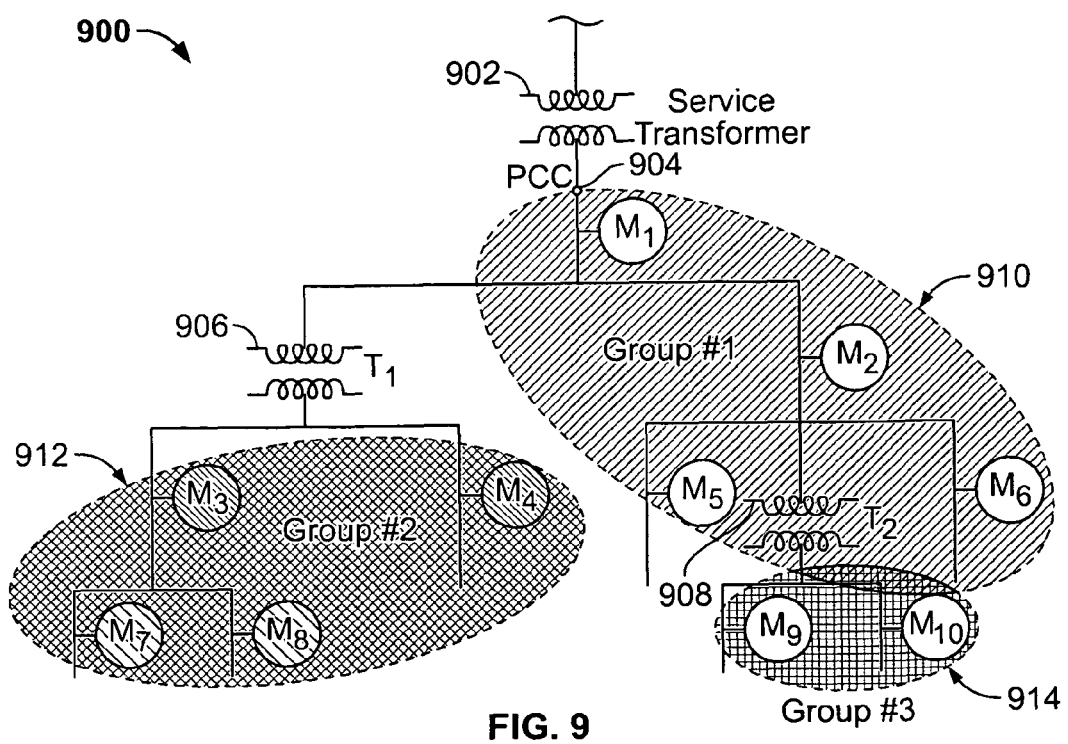
FIG. 9 is a functional block diagram of three groups of IEDs in an electrical system hierarchy with a different set of IEDs reporting anomalous voltage conditions than the set of IEDs shown in FIG. 7.

Reducing or eliminating voltage deviations is not a trivial matter and cannot be done in isolation without considering how any modifications will affect the electrical system as whole. For example, solving a voltage anomaly in one part of a facility may introduce a voltage issue in another part of the facility. Hence, it is important for voltage deviations to be solved from a system perspective and not merely from a local perspective. FIGS. 8 and 9 illustrate these points.

Preferably, the algorithm 300 develops solutions and recommendations for voltage deviations in a systematic fashion—group by group from the source (top of hierarchy) to the load (bottom of hierarchy) of the electrical system—based on the hierarchical (spatial) context of the IEDs and transformers. In the electrical system 800 shown in FIG. 8, three groups of IEDs 810, 812, 814 are shown. The group of IEDs closest to and downstream from the service transformer 802 (Group 1 810) is experiencing voltage deviations. In this example, the voltage deviations are low voltage conditions. The algorithm 300 evaluates the transformer's rated load with respect to its actual load (as given by the adjacent IEDs). If the subject transformer is overloaded, the end-user is notified accordingly to either remove load from the transformer or replace the overloaded transformer with a properly rated transformer. If the end-user has entered transformer ratings within the facility, the algorithm 300 can also make recommendations regarding spare capacity on other transformers within the facility. These recommendations ensure that moving a load will actually result in an improvement with respect to voltage issues. For example, if the service transformer is overloaded, then moving a load to another transformer will be ineffective because the load will ultimately feed through the service transformer at its new location in the hierarchy anyway. The end-user determines whether the transformer recommendations from the algorithm 300 are feasible from a logistics perspective. In this aspect, all relevant transformer ratings should be inputted to the algorithm 300. This is easily done as transformer ratings and tap adjustment information are located on the nameplate of the transformer, for example.

If the service transformer 802 in FIG. 8 is not overloaded, the end-user is requested to contact the utility to evaluate and mitigate the low voltage conditions at the service transformer 802. If the service transformer 802 is equipped with taps, the end-user should enter the existing tap setting into the algorithm 300 as a reference (otherwise, the algorithm assumes that service transformer has taps and is set on center tap). There are typically five tap settings in transformers with taps. The center tap setting (setting #3) is the nominal voltage value of the transformer. There are typically two settings above nominal and two settings below nominal. Each tap movement produces a ±2.5% change in the transformer's output voltage, so raising the tap setting two taps lowers the transformer's output voltage by 5%. Conversely, lowering the tap setting two taps raises the transformer's output voltage by 5%.

Provided the service transformer 802 in FIG. 8 is not overloaded, the algorithm 300 makes a recommendation to lower the tap setting of the service transformer 802. The number of steps a tap is changed at a given transformer depends upon the pre-existing voltage levels measured by the IEDs, the present tap settings for all transformers, and also upon the tap changes to be made at all other transformers in the electrical system 800 (either one or two steps, depending on the severity of the undervoltage). It is important to note that raising the voltage at the output of the service transformer 802 will also raise the voltage for the entire system 800, so this must be taken into consideration. In FIG. 8, raising the voltage at the service transformer 802 may help to alleviate the moderate voltage deviations for Group #1 810 and Group #3 814, but may simultaneously introduce overvoltage levels in Group #2 812. The algorithm 300 automatically determines the appropriate tap settings for all three transformers (the service transformer 802, the transformer 806, and the transformer 808), taking the expected results of these tap adjustments into account. So, if raising the voltage on the output of the service transformer 802 will result in excessive voltages on the output of the transformer 806, the algorithm 300 will also recommend raising the tap on the transformer 806 accordingly to ensure it will operate within its nominal range after the tap of the service transformer 802 is adjusted. Again, the algorithm 300 works from the source to the load to determine its recommendations. Therefore, the recommendation by the algorithm 300 for FIG. 8 is to lower the service transformer 802 tap (correcting the voltage deviations for Group #1 810 and Group #3 814), and to raise the tap of the transformer 806 (offsetting the increase in voltage expected for Group #2 812 due to changing the service transformer's 802 tap).

A second example of the algorithm's ability to make systemic recommendations to the end-user (premised on knowing the monitoring system hierarchy) is illustrated in FIG. 9. In this example, the same monitoring system hierarchy from FIG. 8 is shown so that the groupings (Group #1 910, Group #2 912, and Group #3 914) are the same. In this example, the voltage deviations are high voltage conditions. Only the voltage levels in Group #2 912 are excessive. The IEDs closest to and downstream from the transformer 906 ($M_3$ and $M_4$) are experiencing the highest overvoltage levels while the IEDs further downstream from the transformer 906 ($M_7$ and $M_8$) are experiencing moderate overvoltage levels (due to the voltage drop along the conductors). The algorithm 300 does not consider an overloaded transformer condition because overloaded transformers do not result in high voltage conditions. That is because an overloaded transformer becomes saturated and is then no longer able to provide a proportionally higher output voltage with respect to its input voltage.

Assuming in this case that the end-user did not input any nameplate information regarding the transformer 906, the end-user will receive more than one recommendation because the algorithm 300 requires more data input from the end-user to reduce the number of recommendations (i.e., more information from the end-user better pinpoints the recommendations commensurately). In the FIG. 9 example, the algorithm 300 recommends that the end-user determine whether the transformer 906 incorporates taps, and if so, that the end-user raise the taps some number of steps that best mitigates the voltage deviation problems as perceived by IEDs $M_3$, $M_4$, $M_7$, and $M_8$. The algorithm 300 also recommends that the end-user inspect the transformer 906 to determine its nominal rating and insure that the transformer 906 is suitably applied.

Another cause of voltage deviations that occur on one or two phases only is one or more blown fuses on regulating equipment located within the end-user's facility or upstream from the PCC on the utility system. Depending on the groups of IEDs affected, the algorithm 300 locates the cause when deviations occur on some but not all voltage phases and makes appropriate mitigation recommendations for the end-user to address the problem within their facility or to contact the utility accordingly.

The algorithm 300 takes into account seasonal voltage deviations (possibly due to seasonal load fluctuations in the facility or utility) by evaluating historical voltage data 314 and analyzing it for trends that correlate with seasonal changes. The transformer tap configurations for a lighter-loaded season (spring and fall) may not be prudent for more heavily loaded seasons (summer and winter). In this example, algorithm 300 recommends seasonal service transformer tap changes or the installation of equipment that automatically regulates a facility's incoming voltage.

The algorithm 300 measures the current flow and voltage drop between directly linked IEDs to determine whether voltage deviations can be ameliorated by the additional conductors. Depending on the severity of the voltage deviations and knowledge regarding the existing number of conductors between any given pair of directly linked IEDs, the algorithm 300 recommends the optimal number of conductors to be added in order to cost effectively reduce the voltage drop issue.

Additional recommendations to the end-user by the algorithm 300 may further include:
- load reduction schedules (generally not practical for the end-user),
- load relocations (also generally impractical), and
- larger and/or more conductors to reduce system impedance (and thus, the voltage drop).

To reiterate, certain analyses and recommendations by the algorithm 300 require that the data from the IEDs in the electrical system be arranged in both spatial (hierarchical) and temporal (synchronous or pseudo-synchronous) context. When the voltage data from the IEDs is placed in spatial and temporal context relative to all other capable IEDs in the electrical system, the algorithm 300 can analyze the voltage data from a systemic perspective and suggest recommendations having taken into account how modifications to one part of the system will impact other parts of the system.

General Evaluation of the Effectiveness of a Mitigative Solution

The algorithm 300 permits the end-user to record in an IED or software 132 mitigative data including the mitigative technique that was selected for a particular component in the electrical system (e.g., new transformer, tap setting adjustment, etc.), monetary impact (e.g., cost of maintenance, cost of equipment, etc.), and the installation date of that component. The algorithm 300 determines, based on a statistical analysis of historical data, the efficacy or non-efficacy of any applied mitigative technique by evaluating changes in the systemic voltage profile for the aggregate electrical system. The end-user may produce reports of the findings in both graphical and textual formats summarizing any improvements observed by the algorithm 300 since employing the mitigative technique. An example of such a report describes any apparent correlations between reduced energy consumption and transformer tap changes.

Figure 10:
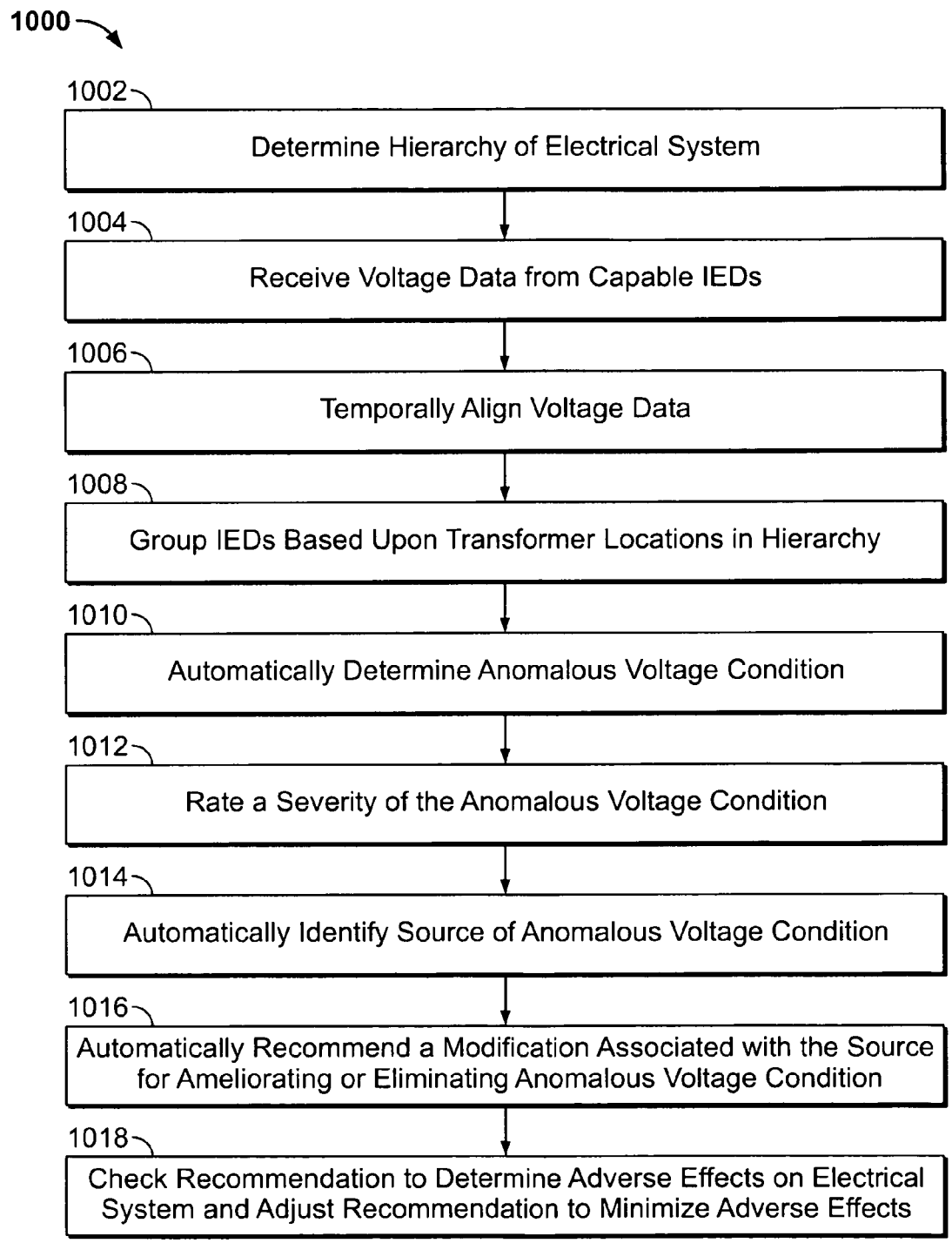
FIG. 10 is a functional block diagram of a voltage analysis algorithm according to some aspects herein.

FIG. 10 is a flow chart diagram of a voltage analysis algorithm 1000 according to an aspect of the implementations disclosed herein for automatically recommending modifications to improve voltage regulation in an electrical system that includes a plurality of IEDs. It should be noted that one or more of the blocks shown in FIG. 10 may be eliminated and that the blocks may be performed or carried out in any order or not at all. Moreover, any or all of these blocks may be carried out by or incorporated into the algorithm 300 discussed above.

The algorithm 1000 either determines a hierarchy of the electrical system automatically or receives the hierarchy of the electrical system via manual entry by an end-user (1002). The hierarchy indicates how the IEDs are linked to one another in the electrical system. The algorithm 1000 receives from at least some of the IEDs respective voltage data indicative of at least one characteristic (e.g., a phase, a magnitude, a duration, or a time of occurrence) of a measured voltage (measured by the respective IEDs) (1004). The respective voltage data is aligned or pseudo-aligned temporally in mutual temporal context to produce aligned voltage data (1006). In other words, the voltage data from one IED is temporally aligned (or pseudo-aligned) with the voltage data from another IED in the utility system. The algorithm 1000 groups the IEDs into a plurality of groups based upon locations of transformers within the hierarchy such that for each group there is no intervening transformer among those IEDs that are members of respective ones of the groups (1008).

The algorithm 1000 analyzes the aligned voltage data to automatically determine at least one anomalous voltage condition present in the electrical system (1010). The algorithm 1000 automatically rates the anomalous voltage condition in one of a plurality of severity levels based upon how much the measured voltage differs from a nominal voltage (1012). Based on at least the automatically determined hierarchy, the algorithm 1000 automatically identifies at least one source of the anomalous voltage condition (1014). The algorithm 1000 automatically recommends a modification associated with the source for ameliorating or eliminating the anomalous voltage condition (1016) and stores recommendation data in a memory indicative of the recommendation. The algorithm 1000 automatically checks or determines whether the proposed modification will adversely affect other devices in said electrical system, and, if so, automatically adjusts the modification to minimize adverse effects on the other devices (1018).

In various additional or alternative aspects, the algorithm 1000 may perform or carry out the following alone or in combination. When the electrical system includes at least one transformer, the algorithm 1000 may determine a nominal value associated with the transformer and determines whether the voltage data associated with an IED near the transformer differs from a nominal value associated with that transformer by a threshold amount. If so, the algorithm 1000 determines that an anomalous condition exists and identifies that transformer as the source of the anomalous voltage condition.

The anomalous voltage condition may represent a voltage that differs from a nominal voltage by at least a first threshold. Accordingly, the algorithm 1000 may further include rating the anomalous voltage condition in one of a plurality of severity levels based upon how much the voltage differs from the nominal voltage in magnitude. The algorithm 1000 may further include associating the first threshold with a first IED and associating a second threshold that differs from the first threshold with a second IED. Severity levels may also be assigned base on the duration of anomalous voltage conditions. Furthermore, the severity levels may be assigned based on some combination of magnitude and duration of anomalous voltage conditions.

The source may be a transformer in the electrical system, and the modification proposed by the algorithm 1000 may include adjusting a transformer tap of the transformer. Accordingly, the algorithm 1000 may further include receiving transformer configuration data indicative of a power rating, a voltage rating, an impedance, or tap changing capability of the transformer, or any combination thereof. The algorithm 1000 may analyze the aligned voltage data over a period of time and determine whether the anomalous voltage condition occurs periodically during that period of time, and, if so, the algorithm 1000 may determine whether a load coupled to the transformer changes with the same periodicity as the anomalous voltage condition. The modification proposed by the algorithm 1000 may, in that case, include resizing the transformer to support a load rating that will eliminate the anomalous voltage condition. The algorithm 1000 may determine whether the transformer is in a utility upstream of the hierarchy or in the end-user's facility. The algorithm may assume that the transformer upstream from the uppermost IED (from a hierarchical perspective) is owned by the utility (i.e., is upstream from the PCC) unless otherwise inputted by the end-user into the algorithm 300.

When the source is a capacitor bank in the electrical system, the modification proposed by the algorithm 1000 may include adding or removing one or more capacitors from the capacitor bank. When the source is a load in the electrical system, the modification proposed by the algorithm 1000 may include moving the load to another point in the hierarchy or reducing the load. When the source is an electric utility in the electrical system, the modification proposed by the algorithm 1000 may include adjusting a transformer tap of a transformer in the electric utility. In that case, the algorithm 1000 may automatically communicate the recommendation data to the electric utility if it is configured to do so by the end-user.

The algorithm 1000 may identify at least one phase affected by the anomalous voltage condition.

Providing end-users with an easier way to identify, evaluate, and reduce/eliminate voltage deviations within their facility is of critical importance to the operation and well being of the facility. Voltage is the blood pressure of an electrical system, and operating with high or low voltage will adversely take its toll on a facility's equipment and infrastructure over time. Quickly identifying, evaluating and mitigating voltage deviations will result in lower maintenance costs, higher productivity, and improved efficiency for facilities, to name a few.

Any of these algorithms, including the algorithms 300, 1000, include machine readable instructions for execution by: (a) a processor, (b) a controller, and/or (c) any other suitable processing device. It will be readily understood that the computer 132 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically recommending modifications to improve voltage regulation in an electrical system including a plurality of intelligent electronic devices (IEDs), comprising:

determining a hierarchy of said electrical system, said hierarchy indicating how said plurality of IEDs are linked to one another in said electrical system;

receiving from at least some of said plurality of IEDs respective voltage data indicative of at least one characteristic of a measured voltage;

aligning or pseudo-aligning temporally said respective voltage data in mutual temporal context to produce aligned voltage data;

analyzing said aligned voltage data to automatically determine at least one anomalous voltage condition present in said electrical system;

based on at least said automatically determined hierarchy, automatically identifying at least one source of said anomalous voltage condition; and storing recommendation data in a memory, said recommendation data indicating a modification associated with said at least one source for ameliorating or eliminating said at least one anomalous voltage condition.

2. The method of claim 1, wherein said electrical system includes a transformer, the method further comprising:

determining a nominal value associated with said transformer, wherein said automatically determining said at least one anomalous condition includes:

determining whether said voltage data associated with one of said IEDs proximate to said transformer differs from said nominal value by a threshold amount, and if so, determining that said at least one anomalous condition exists and identifying said transformer as said at least one source.

3. The method of claim 1, further comprising automatically determining a location in said hierarchy of said at least one source.

4. The method of claim 1, wherein said at least one anomalous voltage condition represents a voltage that differs from a nominal voltage by at least a first threshold.

5. The method of claim 4, further comprising rating said at least one anomalous voltage condition in one of a plurality of severity levels based upon how much said voltage differs from said nominal voltage.

6. The method of claim 4, further comprising:

associating said first threshold with a first of said IEDs; and associating a second threshold that differs from said first threshold with a second of said IEDs.

7. The method of claim 1, wherein said at least one source is a transformer in said electrical system and said modification includes adjusting a transformer tap of said transformer.

8. The method of claim 7, further comprising receiving transformer configuration data indicative of at least one of a power rating, a voltage rating, an impedance, or tap changing capability of said transformer.

9. The method of claim 7, wherein said analyzing said aligned voltage data is carried out over a period of time, the method further comprising determining whether said at least one anomalous voltage condition occurs periodically during said period of time, and, if so, determining whether a load coupled to said transformer changes with the same periodicity as said at least one anomalous voltage condition, wherein said modification includes resizing said transformer to support a load rating that will eliminate said at least one anomalous voltage condition.

10. The method of claim 7, further comprising determining that said transformer is in a utility upstream of said hierarchy.

11. The method of claim 1, wherein said at least one source is a capacitor bank in said electrical system and said modification includes adding or removing or repairing one or more capacitors from said capacitor bank.

12. The method of claim 1, wherein said at least one source is a load in said electrical system and said modification includes moving said load to another point in said hierarchy.

13. The method of claim 1, wherein said at least one source is a load in said electrical system and said modification includes reducing said load.

14. The method of claim 1, wherein said at least one source is an electric utility in said electrical system and said modification includes adjusting a transformer tap of a transformer in said electric utility.

15. The method of claim 1, wherein said at least one source is an electric utility, the method further comprising automatically communicating said recommendation data to said electric utility.

16. The method of claim 1, further comprising identifying at least one phase affected by said anomalous voltage condition.

17. The method of claim 1, wherein said at least one characteristic of said measured voltage includes at least one of a phase of said measured voltage, a magnitude of said measured voltage, a duration of said measured voltage, or a time of occurrence of said measured voltage.

18. The method of claim 1, further comprising grouping said plurality of IEDs into a plurality of groups based upon locations of transformers within said hierarchy such that for each group of said plurality of groups there is no intervening transformer among those of said plurality of IEDs that are members of respective ones of said plurality of groups.

19. The method of claim 1, further comprising automatically determining whether said modification will adversely affect other devices in said electrical system, and, if so, automatically adjusting said modification to minimize adverse effects on said other devices.

20. The method of claim 1, wherein said determining said hierarchy is carried out automatically.

21. A computer program product, comprising one or more non-transitory tangible media having a computer readable program logic embodied therein, the computer readable program logic configured to be executed to implement a method for automatically recommending modifications to improve voltage regulation in an electrical system including a plurality of intelligent electronic devices (IEDs), the method comprising:

determining a hierarchy of said electrical system, said hierarchy indicating how said plurality of IEDs are linked to one another in said electrical system;

receiving from at least some of said plurality of IEDs respective voltage data indicative of at least one characteristic of a measured voltage;

aligning or pseudo-aligning temporally said respective voltage data in mutual temporal context to produce aligned voltage data;

analyzing said aligned voltage data to automatically determine at least one anomalous voltage condition present in said electrical system;

based on at least said automatically determined hierarchy, automatically identifying at least one source of said anomalous voltage condition; and storing recommendation data in a memory, said recommendation data indicating a modification associated with said at least one source for ameliorating or eliminating said at least one anomalous voltage condition.

* * * * *